US010243636B2

(12) United States Patent
Baldemair et al.

(10) Patent No.: US 10,243,636 B2
(45) Date of Patent: Mar. 26, 2019

(54) METHOD AND DEVICE FOR WIRELESS COMMUNICATION (71) Applicant: Telefonaktiebolaget LM Ericsson (publ), Stockholm (SE)

(72) Inventors: Robert Baldemair, Solna (SE); Kumar Balachandran, Pleasanton, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 15/739,478

(22) PCT Filed: Jun. 26, 2015

(86) PCT No.: PCT/SE2015/050748
§ 371 (c)(1),
(2) Date: Dec. 22, 2017

(87) PCT Pub. No.: WO2016/209133
PCT Pub. Date: Dec. 29, 2016

(65) Prior Publication Data
US 2018/0323844 A1 Nov. 8, 2018

(51) Int. Cl.
*H04B 7/06* (2006.01)
*H04L 27/26* (2006.01)

(52) U.S. Cl.
CPC ....... *H04B 7/0617* (2013.01); *H04L 27/2607* (2013.01); *H04L 27/2626* (2013.01); *H04L 27/2655* (2013.01)

(58) Field of Classification Search
CPC .............. H04B 7/0617; H04L 27/2607; H04L 27/2626; H04L 27/2655
See application file for complete search history.

(56) References Cited

U.S. PATENT DOCUMENTS

2014/0146863 A1    5/2014  Seol et al.
2014/0254515 A1*   9/2014  Kim ................. H04W 74/0833
                                                    370/329

(Continued)

FOREIGN PATENT DOCUMENTS

WO    2013154334 A1   10/2013

OTHER PUBLICATIONS

Beamforming Effects on Measured mm-Wave Channel Characteristics by Shurjeel Wyne et al.; IEEE Transactions on Wireless Communications, vol. 10, No. 11—Nov. 2011.

(Continued)

*Primary Examiner* — Dac V Ha
(74) *Attorney, Agent, or Firm* — Patent Portfolio Builders, PLLC (57) ABSTRACT It is disclosed a first device 80; 90 and a second device 100; 110 adapted to communicate wirelessly with each other, and methods performed therein. A guard interval length is determined 54 based on a degree of beamforming to be applied in communication of a first transmission block from the first device to the second device. A guard interval having the determined guard interval length will be applied 56 between the first transmission block communicated to the second device and a second transmission block subsequent to the first transmission block. Transmission efficiency may be increased and overhead may be decreased.

17 Claims, 6 Drawing Sheets (56) References Cited

U.S. PATENT DOCUMENTS

| | | | |
|---|---|---|---|
| 2016/0020842 A1* | 1/2016 | Li | H04B 7/0617 370/329 |
| 2016/0087706 A1* | 3/2016 | Guey | H04L 27/2607 375/267 |
| 2018/0191544 A1* | 7/2018 | Umehara | H04J 11/00 |

OTHER PUBLICATIONS

PCT International Search Report for International application No. PCT/SE2015/050748—dated Feb. 23, 2016.
PCT Written Opinion of the International Searching Authority for International application No. PCT/SE2015/050748—dated Feb. 23, 2016.

* cited by examiner

PRIOR ART

PRIOR ART

METHOD AND DEVICE FOR WIRELESS COMMUNICATION

PRIORITY

This nonprovisional application is a U.S. National Stage Filing under 35 U.S.C. § 371 of International Patent Application Serial No. PCT/SE2015/050748 filed Jun. 26, 2015, and entitled "Method And Device For Wireless Communication."

TECHNICAL FIELD

This disclosure relates to wireless communication. More particularly, it relates to a first device and a second device adapted to wirelessly communicate with each other, and to methods performed therein.

BACKGROUND

Beamforming refers to a set of techniques with which to control a radiation pattern of a radio signal. One method of beamforming is to control a total antenna pattern of an antenna having several antenna elements by adjusting transmission weights of signal components radiating from each individual antenna element.

By choosing transmission weight, energy being transmitted may be directed towards a position of a receiver receiving the transmitted energy.

Figure 1:
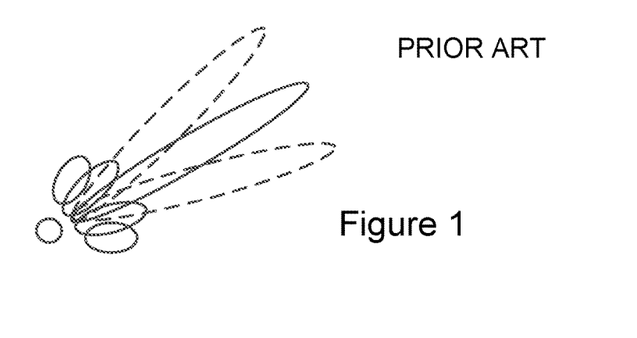
FIG. 1 schematically illustrates a directional antenna radiation pattern according to prior art.

FIG. 1 shows a schematic antenna diagram achievable with beamforming by choosing weights of a phased array antenna. The schematic antenna diagram shows a strong adjustable main lobe and several weaker side lobes. The strong main lobe enables a high antenna gain of an antenna.

Beamforming in general is a technique that enables enhancing capacity and energy efficiency in a wireless network. By performing a beamforming operation, an antenna gain can be increased causing an increased strength of the signal being received; in effect a higher antenna directivity can cause a higher fraction of the energy being transmitted to be transferred to the receiver.

At the same time interference is spread over a smaller area, typically resulting in reduced interference levels for other users in the system. Increased signal to interference plus noise ratio (SINR) may result in higher bit-rates and higher capacity of an air interface. Higher SINR in a packet oriented system may result in shorter packet transmission times, which helps to reduce energy consumption in a system since transmitters and receivers may enter idle mode during a relatively larger ratio of time.

Beamforming with phased array antennas is useful for millimeter-wave radios, i.e. radios for transmitting and receiving waves of millimeter wavelength. These relatively short wavelengths reduce the size of individual antenna elements, which makes it possible to construct high-gain antenna arrays with a plurality of elements at reasonable size.

In contrast, if omni-directional antennas or antennas with low directivity are used at millimeter wavelengths, the resulting antenna aperture is small, which leads to a comparably lower gain and lower power transfer over the air interface to the receiver. This appears as an increased path loss at higher frequencies; indeed, the path loss measured is usually referred to as a signal attenuation between an isotropic radiator and an isotropic receiving antenna element.

In point-to-point communications, the higher path loss can be compensated for by increasing antenna aperture, either as a fixed reflective collector, a fixed antenna array or a phased antenna array.

Beamforming with phased antenna arrays also enables rapid adjustment of beam directions. Phased array antennas may be used in radio-location or radio-navigation (radar) and radio communication such as satellite communications and have also potential applicability in some point-to-multipoint fixed links and mobile communications.

In S. Wyne et al., "Beamforming Effects on Measured mm-Wave Channel Characteristics," IEEE Trans. Wireless Communications, Vol. 10, No. 11, November 2011, it is observed that one effect of beamforming is a significant reduction of the observable delay spread of a received transmission over a wireless communication channel at 60 Giga Hertz (GHz).

Figure 2:
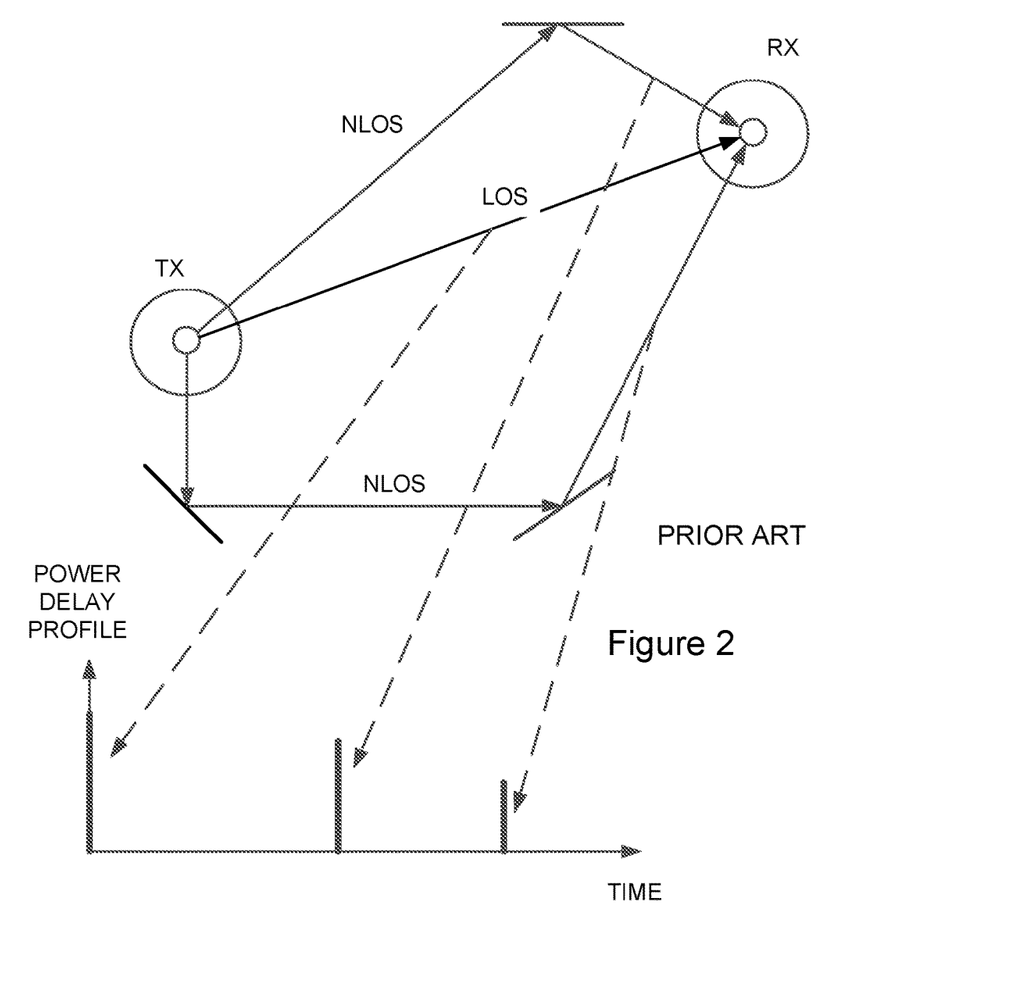
FIG. 2 presents a multi-path radio propagation environment and a power delay profile when omni-directional antennas are used, according to prior art.

FIG. 2 schematically presents a multipath radio propagation environment and a corresponding power delay profile when omni-directional antennas are used. The multi-path propagation environment comprises a line-of-sight (LOS) path as well as non-line-of-sight (NLOS) paths. The power delay profile correspondingly comprises a line-of-sight (LOS) component, but also strong non-line-of-sight (NLOS) components which contribute to an increased delay spread.

Figure 3:
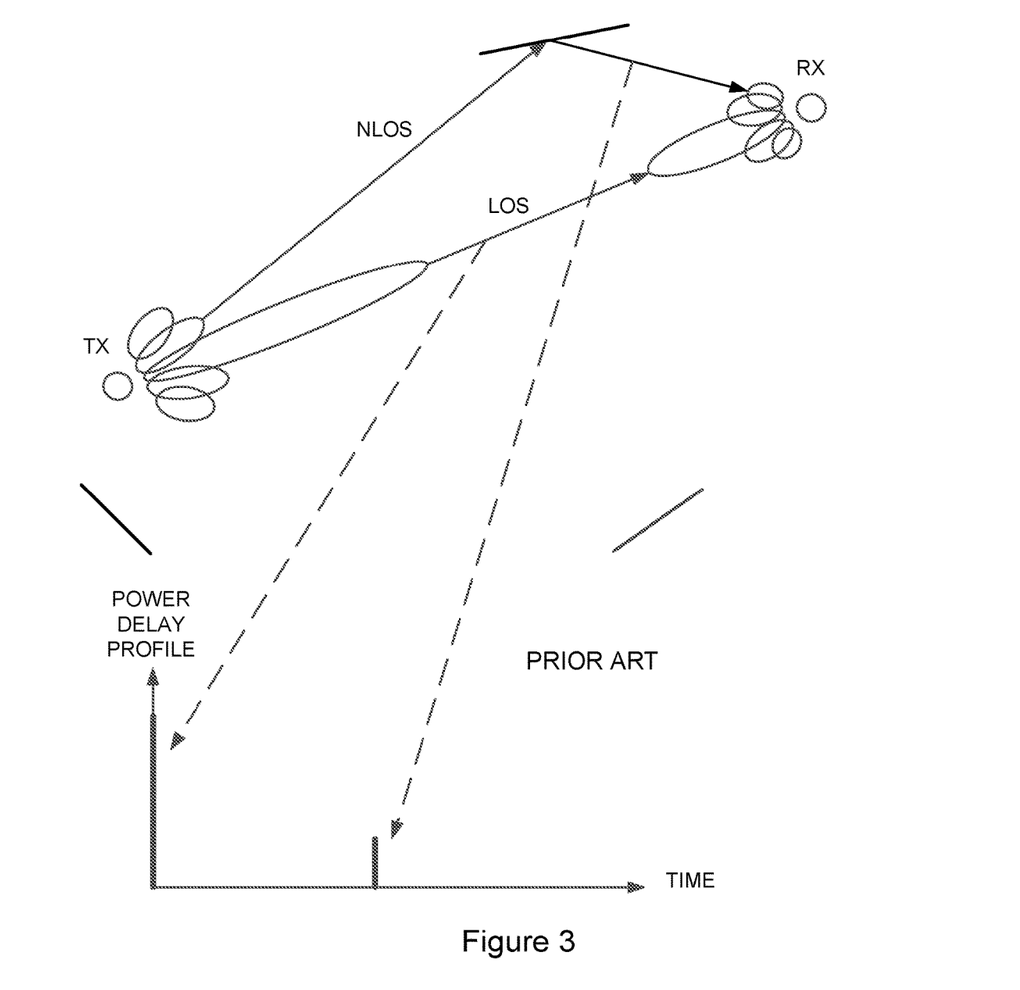
FIG. 3 presents a multi-path radio propagation environment and a power delay profile when directional antennas are used, according to prior art.

FIG. 3 schematically presents the same multipath radio propagation environment as in FIG. 2, but with directional antennas for transmission and reception. FIG. 3 also presents a power delay profile when using the directional antennas. It is seen that the contribution of non-line-of-sight (NLOS) components is reduced as compared to the contribution of NLOS components presented in FIG. 2, since the NLOS components in FIG. 3 are transmitted and/or received with weaker side lobes.

Subsequently received parts in the power delay profile are thus weaker and the root mean square (RMS) delay spread is shortened in FIG. 3 as compared to the one of FIG. 2.

With beamforming, transmitted power flux density can be confined to a small solid angle, effectively increasing the gain of the antenna in comparison to spreading that same energy over the entire sphere around the antenna. Other methods of beamforming such as eigen-beamforming aim to concentrate transmitted energy in such a way as to maximize the power flux density collected by the receiving antenna. Such eigen-beamforming is not necessarily directional, but typical solutions for antenna weighting will tend to favor signal paths with small propagation delay and low scattering. In this respect, the transmitting antenna array, the receiving antenna or receiving antenna array and the propagation environment form an equivalent channel that can be designed adaptively to improve communication performance. Generally one can say that beamforming may reduce the number of dominant components, both line-of-sight and non-line-of-sight components, and thus may reduce delay spread.

The objective of beamforming is to improve the fraction of transmitted energy along dominant signal directions, thus improving an amount of energy that may be captured within an aperture of a receiving antenna.

In today's transmissions systems, it is common to partition transmission blocks by insertion of guard intervals between the transmission blocks.

Figure 4:
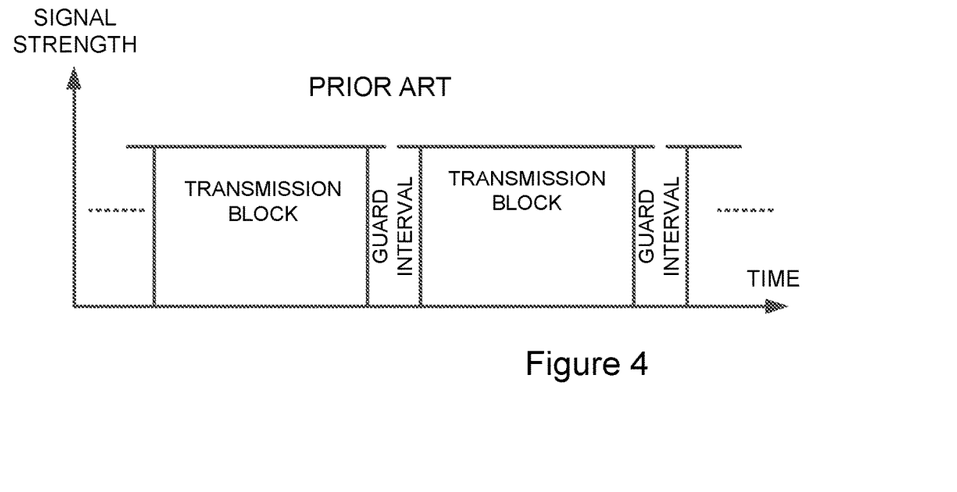
FIG. 4 schematically illustrates a transmitted signal partitioned in transmission blocks, with intervening guard intervals, according to prior art.

FIG. 4 is a schematic representation of a transmitted signal partitioned into transmission blocks with guard intervals inserted between the blocks.

When a transmission block is treated as a composite symbol, it is seen that a tail of an impulse response of one transmission block may interfere with a consecutive transmission block. This inter-block interference is analogous to inter-symbol interference observed in partial response communication channels, i.e. where the communication channel widens symbols and makes symbols interfere with subsequent symbols.

A guard interval may be inserted to avoid power from a transmission block spilling into a next consecutive transmission block when transmitted over a dispersive media, e.g. a wireless communication channel. If the guard interval is long enough to capture the tail of the impulse response of the radio channel being used, all transients from a first transmission block decay within the guard interval and will typically not interfere with a consecutive second transmission block. At the same time, the guard interval should not be longer than necessary since it is generates overhead as it takes more time to transmit data using longer guard intervals.

There are guard intervals of different types. In a first case, no signal is transmitted in the guard interval. In another case, the last part of a subsequent transmission block is transmitted in the guard interval. This part is also called the cyclic prefix, and is an artifice that allows the linear filter operation of the radio channel on the transmission to be equivalent to a circular convolution of the transmitted symbols and the radio channel response. In yet another case, the guard interval can be used to transmit a known signal, for instance in the form of pilot symbols. If this known signal appears before and after the transmission block, the first copy can be seen as the cyclic prefix of the transmission block together with the second copy of the known sequence.

In a wireless communications system some messages or transmission blocks are intended for a single device. In fact most data messages are of this kind. If a device position is known to a base station, transmissions may be beamformed directionally towards the device, enabling advantages of beamforming, such as transmitted energy to be directed to the device of the user and reduced interference towards devices of other users. Other methods of beamforming that may be implemented have the same goal of improving Signal-to-Interference and Noise Ratio (SI NR) at the device, and may use antenna adaptation to transfer energy towards one or more devices along more than one path, the energy being used to carry one or more streams to the plurality of devices. Each of these paths is usually understood to be the consequence of isolated clusters of scatterers in the environment that enable multipath diversity transmission. Each device in such a system will see an equivalent multiple-input multiple-output (MIMO) channel for each transmitted stream, subject to interference that is significantly reduced as compared to when antenna adaptation is not used. If the wireless communications system is designed to enable beamforming, user-specific data can be transmitted using beamforming.

Devices as used herein may comprise user devices, such as user equipments. Devices may additionally or alternatively comprise sensors and actuators in machine-type communication (MTC).

Some messages are intended for many devices, e.g. common control signaling messages. Beamforming is typically not used when the device position is not known, for example at initial access, or when common control messages are intended to a multitude of devices, which would make beamforming to each device impractical. Therefore, there is some benefit in transmitting common control messages with reduced directivity, either without beamforming or at least with much lower beamforming gain as compared to a beamforming gain used when transmitting user-specific data.

Many popular communication standards based on orthogonal frequency division multiplexing (OFDM) do allow for variation of the guard interval. Long term evolution (LTE) and Worldwide interoperability for microwave access (WiMAX) are examples of wireless standards which allow more than one length option for the cyclic prefix. For example, an LTE network may be configured with a cyclic prefix (CP) that is either 5 μs long or with an extended CP that is roughly 17 μs long. These CPs may be configured on a cell-by-cell basis over multiple cells, for example in a deployment of a cellular wireless communication system. The longer cyclic prefix may be used in rural areas in which cells tend to be much larger than in a city.

Even though user-specific data may be transmitted using beamforming and thus allowing a short guard interval to be used, since beamforming reduces delay spread, the wireless communications system may anyway have to use a longer guard interval to match the larger delay spread of transmissions without, or with less, beamforming, such as transmission of common control messages. Also, while narrow beams imply less delay spread, they also imply poorer user localization. Therefore wide beams may be needed to allow users to locate the system, but this means more delay spread. Larger delay spread needs longer guard interval. Lower delay spread can be handled with a shorter guard interval.

A wireless communications system designed to apply a long guard interval between consecutive transmission blocks would result in a system with more overhead than necessary for those communications that occur over equivalent channels having a short power delay profile.

There is hence a need for a solution addressing the issues discussed above.

SUMMARY

It is an object of exemplary embodiments herein to address at least some of the issues outlined above and enable reduction of overhead for communications occurring over channels using a guard interval length longer than necessary. This object and others are achieved by a first device, a second device, and methods performed therein, according to the appended independent claims, and by the exemplary embodiments according to the dependent claims.

According to an aspect, the exemplary embodiments provide a method performed in a first device that is wirelessly communicating with a second device. The method comprises obtaining a degree of beamforming to be applied in communication of a first transmission block to the second device. The method also comprises determining a guard interval length based on the obtained degree of beamforming. In addition, the method comprises applying a guard interval having the determined guard interval length between the first transmission block communicated to the second device and a second transmission block subsequent to the first transmission block.

According to another aspect, the exemplary embodiments provide a first device that is adapted to communicate wirelessly with a second device. The first device is configured to obtain a degree of beamforming to be applied in communication of a first transmission block to the second device. The device is also configured to determine a guard interval length based on the obtained degree of beamforming. In addition, the device is configured to apply a guard interval having the determined guard interval length between the first transmission block communicated to the second device and a second transmission block subsequent to the first transmission block.

According to yet another aspect, the exemplary embodiments provide a method performed in a second device that is wirelessly communicating with a first device. The method comprises determining a degree of beamforming to be applied when receiving a first transmission block from the first device. The method also comprises transmitting the determined degree of beamforming to the first device, to enable the first device to determine a guard interval length to be applied for a guard interval before a transmission block that is transmitted by the first device to the second device and that is subsequent to the first transmission block.

According to still another aspect, the exemplary embodiments provide a second device that is adapted to communicate wirelessly with a first device. The second device is configured to determine a degree of beamforming to be applied in receiving a first transmission block from the first device. The second device is also configured to transmit the determined degree of beamforming to the first device, to enable the first device to determine a guard interval length to be applied for a guard interval before a transmission block that is transmitted by the first device to the second device and that is subsequent to the first transmission block.

By applying a guard interval having a guard interval length that is determined based on the degree of beamforming used in communication of transmission blocks, transmission overhead is reduced and hence system efficiency is increased.

BRIEF DESCRIPTION OF THE DRAWINGS

Embodiments will now be described in more detail, and with reference to the accompanying drawings, in which.

DETAILED DESCRIPTION

In the following description, exemplary embodiments will be described in more detail, with reference to accompanying drawings. For the purpose of explanation and not limitation, specific details are set forth, such as particular examples and techniques in order to provide a thorough understanding.

This disclosure presents adaptation of a length of a guard interval depending on a degree of beamforming applied in communication of a previous transmission block.

For simplicity a case where two different lengths of the guard interval are implemented, one for beamformed transmissions and the other for non-beamformed transmissions, is first described.

When a transmission block is transmitted wirelessly using beamforming, the wireless channel including the transmit and/or receive antenna pattern being used will typically have less delay spread, as compared to when a transmission block is transmitted wirelessly without, or using less, beamforming. Reference is here also made to FIGS. 2 and 3 schematically presenting a power delay profile when using omni-directional antennas and directional antennas, respectively. By a directional antenna is meant an antenna having a transmission and/or reception pattern that is intentionally biased so that it is strong in at least one direction and weak in the other directions. In contrast, an omni-directional antenna is an antenna intended to be equally biased in all directions, although in practice the transmission and/or reception pattern of such omni-directional antennas may deviate from being equally biased in all directions. The delay spread of FIG. 3 is clearly lower than the one of FIG. 2. This is due to that transients, caused by reflections, decay over a shorter time period in the example of FIG. 3 than in the example of FIG. 2.

A comparably shorter guard interval may thus be sufficient to avoid interference with a subsequent transmission block when applying beamforming, whereas for transmissions without beamforming that experience a channel with a comparably longer delay spread, a longer guard interval is required to avoid interference into a next-coming or subsequent transmission block.

Directionality may further refer to the alteration of an antenna's radiation characteristics so that more energy may be radiated in some directions as opposed to others. Typically directional antennas have a main lobe with high gain and possibly side lobes. The figures of merit to describe antenna directivity are the peak gain and the half-power beam-width (HPBW). An omnidirectional cellular antenna has approximately constant peak gain in the azimuthal direction.

Figure 5:
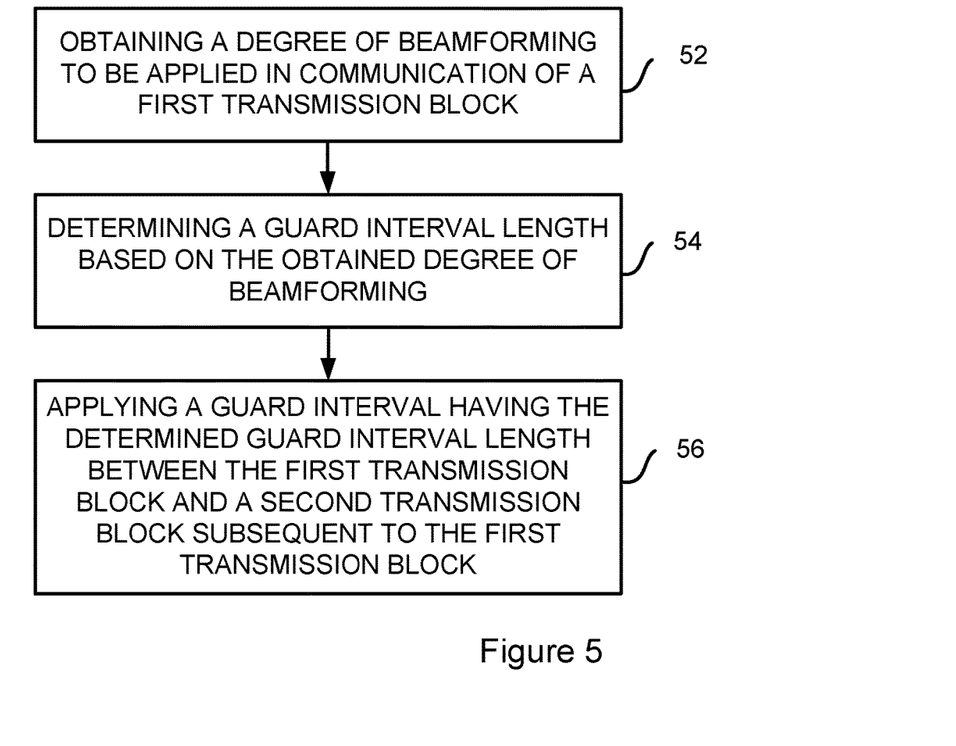
FIG. 5 illustrates a flowchart of a method performed in a first device, according to exemplary embodiments.

FIG. 5 illustrates a flowchart of a method performed in a first device 80; 90 that is wirelessly communicating with a second device 100; 110. The method comprises the following actions:

Action 52: The first device 80; 90 obtains a degree of beamforming to be applied in communication of a first transmission block to the second device 100;110. The degree of beamforming to be applied in communication of the first transmission block may be a degree of beamforming to be applied at the first device 80; 90 when transmitting the first transmission block or a degree of beamforming to be applied at the second device 100; 110 when receiving the first transmission block. The degree of beamforming may alternatively comprise a combination of a degree of beamforming to be applied at the first device 80; 90 when transmitting the first transmission block and a degree of beamforming to be applied at the second device 100; 110 when receiving the first transmission block.

Thus, obtaining the degree of beamforming may in some embodiments comprise determining a first degree of beamforming to be applied by the first device 80; 90 when transmitting the first transmission block to the second device 100; 110.

Obtaining the degree of beamforming may further in some embodiments comprise receiving a second degree of beamforming from the second device 100; 110, wherein the second degree of beamforming will be applied by the second device 100; 110 when receiving the first transmission block from the first device 80; 90. In such embodiments, obtaining the degree of beamforming may comprise determining the degree of beamforming based on the determined first degree of beamforming and the received second degree of beamforming.

Determining the degree of beamforming may in some embodiments comprise determining a beamforming gain by multiplying a first beamforming gain pertaining to the determined first degree of beamforming with a second beamforming gain pertaining to the received second degree of beamforming.

Alternatively, determining the degree of beamforming may comprise determining a beamforming gain by performing a maximum operation over a first beamforming gain pertaining to the determined first degree of beamforming and a second beamforming gain pertaining to the received second degree of beamforming. Performing the maximum operation over the first beamforming gain and the second beamforming gain comprises selecting the maximum of the first beamforming gain and the second beamforming gain. For instance, if the first beamforming gain is 20 dB, and the second beamforming gain is 15 dB, then the first beamforming gain is selected as the result of the maximum operation.

Action 54: The first device 80; 90 determines a guard interval length based on the obtained degree of beamforming.

Determining the guard interval length may comprise applying a relation between degree of beamforming and guard interval length such that the higher the obtained degree of beamforming, the shorter the determined guard interval length. In other words, the relation between the degree of beamforming and guard interval length may be such that the guard interval length decreases when the degree of beamforming increases, and vice versa, i.e. such that the guard interval length increases when the degree of beamforming decreases.

Determining the guard interval length may further comprise mapping the degree of beamforming to a guard interval length in a mapping table.

Determining the guard interval length may in some embodiments comprise determining a first guard interval length when the obtained degree of beamforming is below a threshold, and determining a guard interval length being shorter than the first guard interval length when the degree of beamforming equals to, or is above, the threshold.

The guard interval may comprise at least one of: a number of zero-symbols; a cyclic prefix, i.e. a repetition of a last part of the second transmission block; and a sequence of symbols known to the second device 100; 110.

The first device 80; 90 may in some embodiments communicate or transmit the determined guard interval length or the obtained degree of beamforming to the second device 100; 110.

Action 56: The first device 80; 90 applies a guard interval having the determined guard interval length between the first transmission block communicated to the second device 100; 110 and a second transmission block subsequent to the first transmission block. The second transmission block that is subsequent to the first transmission block may in some embodiments be a next transmission block following after the first transmission block.

The method performed in the first device 80; 90 may also comprise communicating the first transmission block to the second device 100; 110 and communicating the second transmission block, wherein the first and second transmission blocks are spaced in time by a guard interval having the determined guard interval length. The second transmission block may or may not be destined for the second device 100; 110.

In further embodiments, the first device 80; 90 may further wirelessly communicate with a third device. Obtaining the degree of beamforming may then further comprise determining a third degree of beamforming to be applied in communication of a third transmission block to the third device. The communication of the third transmission block may in these embodiments be simultaneous to, i.e. performed at the same time as, the communication of the first transmission block. In addition, the determining the guard interval length may comprise determining the guard interval length based on the lower of the obtained degree of beamforming to be applied in communication of the first transmission block and the determined third degree of beamforming to be applied in communication of the third transmission block.

The simultaneous communication of said first and third transmission blocks may further comprise synchronizing communication of said first and third transmission blocks.

Synchronizing said communication of said first and third transmission blocks may comprise communicating said first and third transmission blocks as initial transmission blocks out of a number of transmission blocks transmitted in a time segment, to said second and third devices, respectively. The number of transmission blocks transmitted within the time segment may depend on what guard interval lengths are needed between the transmission blocks.

Figure 6:
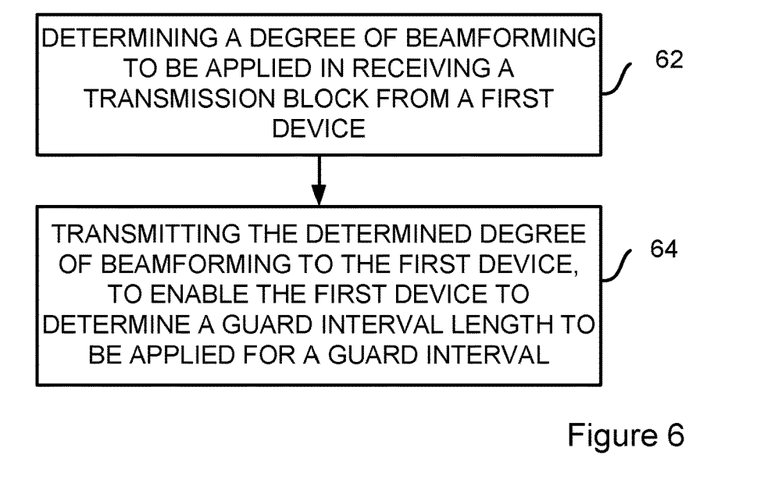
FIG. 6 illustrates a flowchart of a method performed in a second device, according to exemplary embodiments.

FIG. 6 illustrates a flowchart of a method performed in a second device 100; 110 that is wirelessly communicating with a first device 80; 90. The method comprises the following actions:

Action 62: The second device 100; 110 determines a degree of beamforming to be applied when receiving a first transmission block from the first device 80; 90. Determining the degree of beamforming may in some embodiments comprise receiving a degree of beamforming, to be applied in the communication of the first transmission block, from the first device 80; 90. The degree of beamforming to be applied in communication of the first transmission block may be a degree of beamforming to be applied at the first device 80; 90 when transmitting the first transmission block. The degree of beamforming to be applied at the second device 100; 110 when receiving the first transmission block from the first device 80; 90 may then in some embodiments be determined based on the degree of beamforming to be applied at the first device 80; 90 when transmitting the first transmission block.

Action 64: The second device 100; 110 transmits the determined degree of beamforming to the first device 80; 90, to enable the first device 80; 90 to determine a guard interval length to be applied for a guard interval before a transmission block that is transmitted by the first device 80; 90 to the second device 100; 110 and that is subsequent to the first transmission block. The transmission block that is transmitted by the first device 80; 90 to the second device 100; 110 and that is subsequent to the first transmission block may in some embodiments be a next transmission block following after the first transmission block.

The second device 100; 110 may in some embodiments determine the guard interval length based on the received degree of beamforming. The determination of the guard interval length may in some of these embodiments further be based on the determined degree of beamforming to be applied when receiving the first transmission block from the first device 80; 90.

The second device 100; 110 may then to receive a second transmission block from the first device 80; 90, at a time, a time period after receipt of the first transmission block, where the time period equals to or otherwise corresponds to the determined guard interval length. To receive the second transmission block, the second device 100; 110 may use the determined guard interval length to determine when the second transmission block starts.

In alternative embodiments, the second device 100; 110 may receive the guard interval length from the first device 80; 90. The second device 100; 110 may then receive a second transmission block from the first device, at a time, a time period after receipt of the first transmission block, where the time period equals to or otherwise corresponds to the received guard interval length. To receive the second transmission block, the second device 100; 110 may use the received guard interval length to determine when the second transmission block starts.

Figure 7:
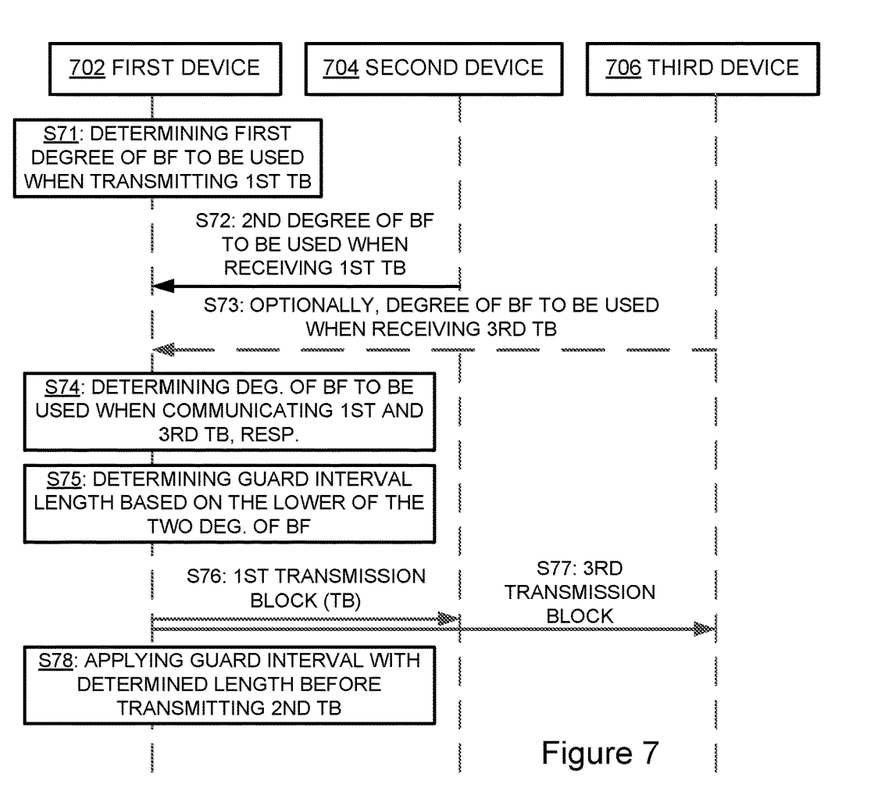
FIG. 7 presents a schematic signaling diagram of signaling between a first, a second and a third device, according to exemplary embodiments.

FIG. 7 schematically presents an example of a signaling diagram illustrating signaling between a first device 702, a second device 704 and a third device 706. In S71, the first device 702 determines a degree of beamforming to be used when transmitting a first transmission block. Optionally, the first device 702 may also in S71 determine a degree of beamforming to be used when transmitting a third transmission block. In S72, the second device 704 sends to the first device 702 the degree of beamforming that will be used when receiving the first transmission block at the second device 704. In S73 the third device 706 may optionally send, to the first device 702, a degree of beamforming that will be used when receiving the third transmission block at the third device 706. In S74, the first device 702 determines the degree of beamforming to be used when communicating the first transmission block to the second device 704, and the degree of beamforming to be used when communicating the third transmission block to the third device 706. In S75 the first device 702 determines a guard interval length based on the lower of the two degrees of beamforming to be used when communicating the first and the third transmission block, respectively. In S76 the first transmission block is transmitted by the first device 702 to the second device 704. In S77, the third transmission block is transmitted by the first device 702 to the third device 706. The transmission of the third transmission block in S77 may be simultaneous to, i.e. performed at the same time as, the transmission of the first transmission block in S76. In S78, the first device 702 applies the determined guard interval length to a guard interval before communicating a second transmission block. This second transmission block may be transmitted to the second device 704 or third device 706 or to a device other than the second device 704 or third device 706.

If the first device 702 communicates one transmission block at a time, i.e. there are no simultaneous communications, the determination of the length of the guard interval is based on the degree of beamforming applied in communication of the transmission block communicated at the time.

If no beamforming is applied when receiving the first transmission block by the second device 704, the degree of beamforming applied when communication the first transmission block may be the degree of beamforming applied by the first device 702 when transmitting the first transmission block, only. Similarly, when communicating the third transmission block to the third device 706; if no beamforming is used when receiving the third transmission block by the third device 706, the degree of beamforming applied by the first device 702 when communicating the third transmission block may be the degree of beamforming applied when transmitting the third transmission block by the first device 702.

As explained above, the delay spread may be reduced when applying beamforming. The amount by which the delay spread may be reduced depends on the applied degree of beamforming. The higher the degree of beamforming, the lower the delay spread.

TABLE 1

Relation between a guard interval length and the degree of beamforming

| Degree of beamforming | Guard interval length |
|---|---|
| none | L1 |
| very low | L2 |
| low | L3 |
| medium | L4 |
| high | L5 |
| very high | L6 |

Table 1 presents an example of how a guard interval length may depend on an applied degree of beamforming. The guard interval length in Table 1 decreases with increasing degree of beamforming, i.e. $L1 \geq L2 \geq L3 \geq L4 \geq L5 \geq L6$.

The degree of beamforming may also be quantified by expressing the degree of beamforming as, e.g., a beamforming gain, a main lobe width (measured at half lobe height) the number of antenna elements used for the beamforming, the ratio of main lobe strength over side lobe strength, etc.

TABLE 2

An example of how a guard interval length may depend on an applied beamforming gain.

| Beamforming gain | Guard interval length |
|---|---|
| < threshold | L1 |
| ≥ threshold | L2 |

In the example of Table 2, two guard interval lengths may be implemented; one, i.e. L1, for transmissions without beamforming or with a beamforming gain below a certain threshold value; and another shorter guard interval, i.e. L2, for beamformed transmissions using a beamforming gain, equal to, or above, said certain threshold value.

The relation between a degree of beamforming and a beamforming gain is such that a higher degree of beamforming corresponds to a higher beamforming gain and vice versa, i.e. a lower degree of beamforming corresponds to a lower beamforming gain.

If messages of different types, e.g. user-specific data and common control messages, or generally transmissions with different degrees of beamforming, are transmitted in one transmission block, the guard interval length of the subsequent guard interval may be set to a function of the individual different beamforming gains used for communication of the transmission block. The guard interval length of the subsequent guard interval may alternatively be determined based on the communication with the least beamforming gain.

As indicated above, beamforming applied in communication of transmission blocks may comprise beamforming applied at the transmitting device for transmitting the transmission blocks, but also beamforming applied at the receiving device for receiving said transmission blocks. Each antenna array has associated with it an array pattern that multiplies the patterns of antenna elements included in the antenna array. The resulting antenna directivity may be referred to as $A(\theta,\phi)$, where $\theta$ and $\phi$ are the azimuthal and elevation angles. The total beamforming gain for the communication of transmission blocks may then be a function of the beamforming gain used for transmitting and the beamforming gain used for receiving transmission blocks. The total or resulting beamforming gain used in the communication may in one example be determined as the product of the two beamforming gains, as shown in Table 4 below. Another way of determining the beamforming gain may be to maximize the product of the transmitting and receiving directional antenna gains over all azimuthal and elevation angles, where a common frame of reference is used for the coordinate system assuming a line of sight between the two antenna arrays. However, in link budget calculations simplified calculation by multiplying the maximum antenna gain from each of the antenna arrays with the empirical path loss relative to an isotropic antenna pair may be used.

TABLE 3

An example of how a guard interval length may depend on a beamforming gain applied when transmitting transmission blocks and a beamforming gain applied when receiving said transmission blocks; here L1, L2 and L3 designate guard interval lengths that are thresholded by specific equivalent antenna gains, i.e. that are applied depending on threshold conditions for total beamforming gain, expressed as specific equivalent antenna gains.

| Transmitting directional array gain | Receiving directional array gain | Total beamforming gain applied in communication | Guard interval length |
|---|---|---|---|
| $A_{1,t}(\theta,\phi)$ | $A_{1,r}(\theta,\phi)$ | $\max(A_{1,t}(\theta,\phi) A_{1,r}(\theta,\phi))$ | L1 |
| $A_{2,t}(\theta,\phi)$ | $A_{2,r}(\theta,\phi)$ | $\max(A_{2,t}(\theta,\phi) A_{2,r}(\theta,\phi))$ | L2 |
| $A_{3,t}(\theta,\phi)$ | $A_{3,r}(\theta,\phi)$ | $\max(A_{3,t}(\theta,\phi) A_{3,r}(\theta,\phi))$ | L3 |

Other methods of determining guard intervals may be used, based on the minimum of the angular spread in azimuth and elevation of the array patterns, for example.

TABLE 4

Another example of how a guard interval length may depend on a beamforming gain applied when transmitting transmission blocks and a beamforming gain applied when receiving said transmission blocks; here L1, L2 and L3 designate guard interval lengths that are thresholded by specific equivalent antenna gains. For instance, a guard interval having a guard interval length L1 may be applied subsequent to communication of a transmission block using a BF gain where, O < BF gain < Y1 × H1. The shorter guard interval length L2, i.e. L2 < L1, may be applied subsequent to communication of transmission block using a BF gain where Y1 × H1 < BF gain < Y2 × H2. Also, after communication of a transmission block using a BF gain where Y2 × H2 < BF gain < Y3 × H3, an even shorter guard interval length L3, i.e. L3 < L2, may be used for a guard interval directly following the communication of the transmission block.

| Transmitting beamforming (BF) gain | Receiving beamforming gain | Total beamforming gain applied in communication | Guard interval length |
|---|---|---|---|
| Y1 | H1 | Y1 × H1 | L1 |
| Y2 | H2 | Y2 × H2 | L2 |
| Y3 | H3 | Y3 × H3 | L3 |

The length of the guard interval is determined based on the degree of beamforming, or for instance the beamforming gain, applied in the communication of a transmission block. Beamformed communication of transmission blocks over a channel having a relatively low delay spread, may be performed with a relatively short guard interval. Non-beamformed, or less beamformed, communication of transmission blocks over a channel having a relatively higher delay spread, may be performed with a relatively longer guard interval.

The length of the guard interval may in this respect be considered to be determined based on the delay spread. Accordingly, beamformed transmissions, which experience a channel with a relatively low delay spread, may be transmitted with a comparably short guard interval, whereas non-, or less, beamformed transmissions, which experience a channel with relatively higher delay spread, may be transmitted with a comparably longer guard interval.

Since guard intervals contribute to overhead of a wireless communication system, decreasing the length of the guard interval being used increases communication efficiency of said system.

Figure 8:
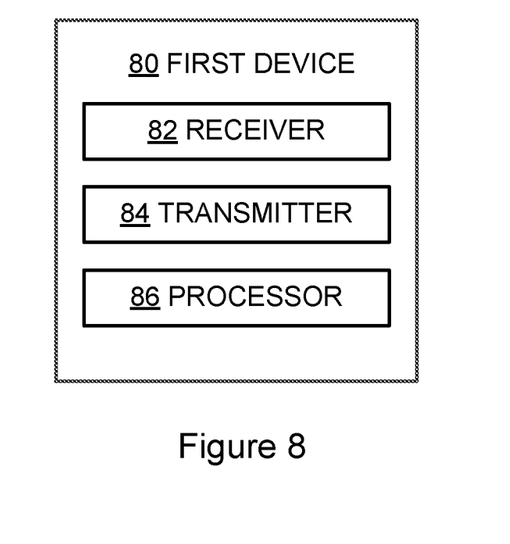
FIGS. 8 and 9 schematically present the first device according to exemplary embodiments of this disclosure.
Figure 9:
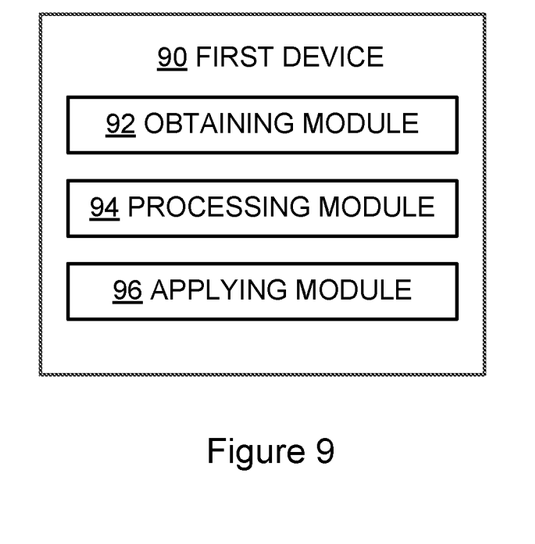

To perform the methods described herein, a first device 80; 90 is provided. The first device 80; 90 is adapted to communicate wirelessly with a second device 100; 110. The first device 80; 90 is configured to obtain a degree of beamforming to be applied in communication of a first transmission block to the second device 100; 110. The first device 80; 90 being configured to obtain a degree of beamforming to be applied in communication of a first transmission block to the second device 100; 110, may comprise the first device 80; 90 being configured to obtain a degree of beamforming to be applied at the first device 80; 90 when transmitting the first transmission block and/or a degree of beamforming to be applied in receiving the first transmission block at the second device 100; 110. The obtained degree of beamforming may thus be a degree of beamforming to be applied at the first device 80; 90 when transmitting the first transmission block or a degree of beamforming to be applied at the second device 100; 110 when receiving the first transmission block. The obtained degree of beamforming may alternatively comprise a combination of a degree of beamforming to be applied at the first device 80; 90 when transmitting the first transmission block and a degree of beamforming to be applied at the second device 100; 110 when receiving the first transmission block.

The first device 80; 90 being configured to obtain the degree of beamforming may in some embodiments comprise the first device 80; 90 being configured to determine a first degree of beamforming to be applied by the first device 80; 90 when transmitting the first transmission block to the second device 100; 110.

The first device 80; 90 being configured to obtain the degree of beamforming may further, in some embodiments comprise the first device 80; 90 being configured to receive a second degree of beamforming from the second device 100; 110, wherein the second degree of beamforming will be applied by the second device 100; 110 when receiving the first transmission block from the first device 80; 90.

In such embodiments, the first device 80; 90 being configured to obtain the degree of beamforming may comprise the first device 80; 90 being configured to determine the degree of beamforming based on the determined first degree of beamforming and the received second degree of beamforming.

The first device 80; 90 being configured to determine the degree of beamforming may further comprise the first device 80; 90 being configured to determine a beamforming gain by being configured to multiply a first beamforming gain pertaining to the determined first degree of beamforming with a second beamforming gain pertaining to the received second degree of beamforming.

Alternatively, the first device 80; 90 being configured to determine the degree of beamforming may comprise the first device 80; 90 being configured to determine a beamforming gain by being configured to perform a maximum operation over a first beamforming gain pertaining to the determined first degree of beamforming and a second beamforming gain pertaining to the received second degree of beamforming.

The first device 80; 90 is also configured to determine a guard interval length based on the obtained degree of beamforming.

The first device 80; 90 may also be configured to communicate the determined guard interval length or the obtained degree of beamforming to the second device 100; 110.

The first device 80; 90 being configured to determine the guard interval length may further comprise the first device (80; 90) being configured to apply a relation between degree of beamforming and guard interval length such that the higher the obtained degree of beamforming, the shorter the determined guard interval length. In other words, the first device 80; 90 being configured to determine the guard interval length may further comprise the first device 80; 90 being configured to apply a relation between the degree of beamforming and guard interval length being such that the guard interval length decreases when the degree of beamforming increases, and vice versa, i.e. such that the guard interval length increases when the degree of beamforming decreases.

The first device 80; 90 being configured to determine the guard interval length may in some embodiments comprise the first device 80; 90 being configured to map the degree of beamforming to a guard interval length in a mapping table.

The first device 80; 90 being configured to determine the guard interval length may additionally or alternatively comprise first device 80; 90 being configured to determine a first guard interval length when the obtained degree of beamforming is below a threshold, and to determine a guard interval length being shorter than the first guard interval length when the degree of beamforming equals to, or is above, the threshold.

According to some embodiments, the guard interval may comprise one or more of: a number of zero-symbols, a cyclic prefix, i.e. a repetition of a last part of the second transmission block, and a sequence of symbols known to the second device 100; 110.

In addition, the first device is configured to apply a guard interval having the determined guard interval length between the first transmission block communicated to the second device 100; 110 and a second transmission block subsequent to the first transmission block. The second transmission block that is subsequent to the first transmission block may in some embodiments be a next transmission block following after the first transmission block.

The first device 80; 90 may further be configured to communicate the first transmission block to the second device 100; 110 by being configured to transmit the first transmission block to the second device 100; 110. Furthermore, the first device 80; 90 may be configured to communicate the second transmission block by being configured to transmit the second transmission block, wherein the first and second transmission blocks are spaced in time by a guard interval having the determined guard interval length. The second transmission block may or may not be destined for the second device 100; 110.

In further embodiments the first device 80; 90 may further be configured to wirelessly communicate with a third device and to determine a third degree of beamforming to be applied in communication of a third transmission block to the third device. The communication of the third transmission block may in these embodiments be simultaneous to, i.e. performed at the same time as, the communication of the first transmission block. In addition, the first device 80; 90 may be configured to determine the guard interval length based on the lower of the obtained degree of beamforming to be applied in communication of the first transmission block and the determined third degree of beamforming to be applied in communication of the third transmission block.

The first device 80; 90 may in some embodiments be configured to synchronize communication of said first and third transmission blocks.

The first device 80; 90 being configured to synchronize communication of said first and third transmission blocks may further comprise the first device 80; 90 being configured to communicate said first and third transmission blocks as initial transmission blocks out of a number of transmission blocks transmitted in a time segment, to said second and third devices, respectively. The number of transmission blocks transmitted within the time segment may depend on what guard interval lengths are needed between the transmission blocks. A possible realization of the first device 80; 90, is in FIG. 8 represented as first device 80, adapted to wirelessly communicate with a second device 100; 110, according to exemplary embodiments of this disclosure. The first device 80 comprises a receiver 82, a transmitter 84 and a processor 86. The first device 80 is configured to obtain, via the receiver 82, a degree of beamforming to be applied in communication of a first transmission block to the second device 100; 110. The first device 80 is also configured to determine, by the processor 86, a guard interval length based on the obtained degree of beamforming. In addition, the first device 80 is also configured to apply, by using the transmitter 84, a guard interval having the determined guard interval length between the first transmission block communicated to the second device 100; 110 and a second transmission block subsequent to the first transmission block.

Another possible realization of the first device 80; 90, is in FIG. 9 schematically presented as first device 90 adapted to wirelessly communicate with a second device, according to exemplary embodiments of this disclosure. The first device 90 of FIG. 9 comprises an obtaining module 92, a processing module 94 and an applying module 96. The obtaining module 92 is configured to obtain a degree of beamforming to be applied in communication of a first transmission block to the second device 100; 110. The processing module 94 is configured to determine a guard interval length based on the obtained degree of beamforming. Also, the applying module 96 is configured to apply a guard interval having the determined guard interval length between the first transmission block communicated to the second device 100; 110 and a second transmission block subsequent to the first transmission block.

Figure 10:
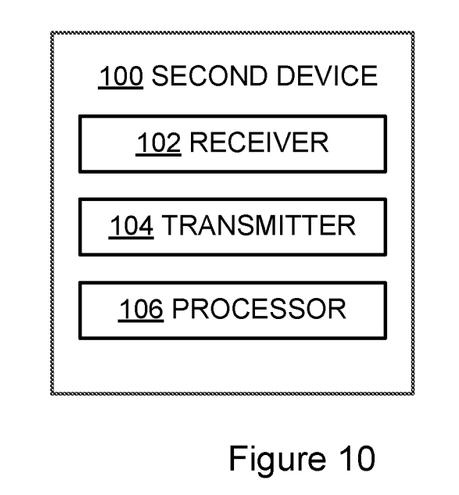
FIGS. 10 and 11 schematically present the second device according to exemplary embodiments of this disclosure.
Figure 11:
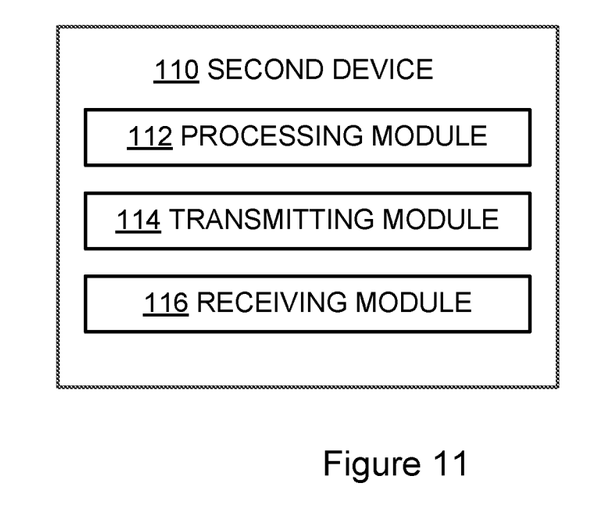

Moreover, to perform the methods described herein, a second device 100; 110 is provided. The second device 100; 110 is adapted to communicate wirelessly with a first device 80; 90. The second device 100; 110 is configured to determine a degree of beamforming to be applied when receiving a transmission block from the first device 80; 90. The second device 100; 110 being configured to determine the degree of beamforming may in some embodiments comprise the second device 100; 110 being configured to receive, from the first device 80; 90, a degree of beamforming to be applied in the communication of the first transmission block. The degree of beamforming to be applied in communication of the first transmission block may be a degree of beamforming to be applied at the first device 80; 90 when transmitting the first transmission block. The second device 100; 110 may then in some embodiments be configured to determine the degree of beamforming to be applied at the second device 100; 110 when receiving the first transmission block based on the received degree of beamforming.

The second device is also configured to transmit the determined degree of beamforming to the first device 80; 90, to enable the first device 80; 90 to determine a guard interval length to be applied for a guard interval before a transmission block that is transmitted by the first device 80; 90 to the second device 100; 110 and that is subsequent to the first transmission block. The transmission block that is transmitted by the first device 80; 90 to the second device 100; 110 and that is subsequent to the first transmission block may in some embodiments be a next transmission block following after the first transmission block.

The second device 100; 110 may also be configured to determine the guard interval length based on the received degree of beamforming. The second device 100; 110 may further in some embodiments be configured to base the determination of the guard interval length on the determined degree of beamforming to be applied when receiving the first transmission block from the first device 80; 90. Alternatively, the second device 100; 110 may be configured to determine the guard interval length by being configured to receive the guard interval length from the first device 80; 90.

The second device 100; 110 may further be configured to receive the first transmission block from the first device 80; 90 using the determined degree of beamforming and to receive a second transmission block from the first device 80; 90, at a time, a time period after receipt of the first transmission block, where the time period equals to or otherwise corresponds to the determined guard interval length. The second transmission block is thus a transmission block that is transmitted by the first device 80; 90 to the second device 100; 110 and that is subsequent to the first transmission block.

FIG. 10 schematically presents a possible realization of the second device 100; 110, which in FIG. 10 is represented as second device 100, being adapted to perform the methods, according to some of the exemplary embodiments of this disclosure.

The second device 100 comprises a receiver 102, a transmitter 104 and a processor 106.

The receiver 102 is configured to receive a first transmission block from the first device 80; 90. The receiver 102 may further be configured to receive a degree of beamforming to be applied in communication of the first transmission block from the first device 80; 90. The degree of beamforming to be applied in communication of the first transmission block may be a degree of beamforming to be applied at the first device 80; 90 when transmitting the first transmission block. The receiver 102 may further be configured to receive a transmission block that is transmitted by the first device 80; 90 to the second device 100; 110 and that is subsequent to the first transmission block. The receiver 102 may further in some embodiments be configured to receive a guard interval length from the first device 80; 90. The guard interval length is to be applied for a guard interval before the transmission block that is transmitted by the first device 80; 90 to the second device 100; 110 and that is subsequent to the first transmission block. The received transmission block that is subsequent to the first transmission block may be a second transmission block received by the receiver 102, from the first device 80; 90, at a time, a time period after receipt of the first transmission block, where the time period equals to, or otherwise corresponds to, the guard interval length.

The processor 106 is configured to determine a degree of beamforming to be applied by the receiver 102 when receiving the first transmission block from the first device 80; 90. The processor 106 may in some embodiments be configured to determine the degree of beamforming to be applied at the second device 100; 110 when receiving the first transmission block based on the received degree of beamforming to be applied in communication of the first transmission block, from the first device 80; 90. The processor 106 may also be configured to determine the guard interval length based on the received degree of beamforming. The processor 106 may further in some embodiments be configured to base the determination of the guard interval length on the determined degree of beamforming to be applied when receiving the first transmission block from the first device 80; 90. Alternatively, the processor 106 may be configured to determine the guard interval length as the guard interval length received from the first device 80; 90 by the receiver 102.

The transmitter 104 is configured to transmit the determined degree of beamforming to the first device 80; 90, to enable the first device 80; 90 to determine the guard interval length to be applied for the guard interval before the transmission block that is transmitted by the first device 80; 90 to the second device 100; 110 and that is subsequent to the first transmission block.

FIG. 11 schematically presents another possible realization of the second device 100; 110, which in FIG. 11 is represented as second device 110, being adapted to perform the methods, according to some of the exemplary embodiments of this disclosure. The second device 110 comprises a processing module 112, a transmitting module 114 and a receiving module 116.

The receiving module 116 is configured to receive a first transmission block from the first device 80; 90. The receiving module 116 may further be configured to receive a degree of beamforming to be applied in communication of the first transmission block from the first device 80; 90. The degree of beamforming to be applied in communication of the first transmission block may be a degree of beamforming to be applied at the first device 80; 90 when transmitting the first transmission block. The receiving module 116 may further be configured to receive a transmission block that is transmitted by the first device 80; 90 to the second device 100; 110 and that is subsequent to the first transmission block. The receiving module 116 may further in some embodiments be configured to receive a guard interval length from the first device 80; 90. The guard interval length is to be applied for a guard interval before the transmission block that is transmitted by the first device 80; 90 to the second device 100; 110 and that is subsequent to the first transmission block. The received transmission block that is subsequent to the first transmission block may be a second transmission block received by the receiving module 116, from the first device 80; 90, at a time, a time period after receipt of the first transmission block, where the time period equals to, or otherwise corresponds to, the guard interval length.

The processing module 112 is configured to determine a degree of beamforming to be applied by the receiving module 116 when receiving the first transmission block from the first device 80; 90. The processing module 112 may in some embodiments be configured to determine the degree of beamforming to be applied at the second device 100; 110 when receiving the first transmission block based on the received degree of beamforming to be applied in communication of the first transmission block, from the first device 80; 90. The processing module 112 may also be configured to determine the guard interval length based on the received degree of beamforming. The processing module 112 may further in some embodiments be configured to base the determination of the guard interval length on the determined degree of beamforming to be applied when receiving the first transmission block from the first device 80; 90. Alternatively, the processing module 112 may be configured to determine the guard interval length as the guard interval length received from the first device 80; 90 by the receiving module 116.

The transmitting module 114 is configured to transmit the determined degree of beamforming to the first device 80; 90, to enable the first device 80; 90 to determine the guard interval length to be applied for the guard interval before the transmission block that is transmitted by the first device to the second device and that is subsequent to the first transmission block.

The present disclosure allows for changing the guard interval length dynamically for a communication system using transmission blocks.

Within a framing structure for information that is consistent for the system, i.e. where the frame length is fixed and independent of the guard interval length, the guard interval, and consequently the number of symbols that fit into the fixed frame length, may be varied according to the type of data being transmitted.

In general, a wireless communications system using a substantial beamforming gain causes a relatively low interference. In such a system, different guard interval lengths between transmissions blocks may be used. However, it may be an advantage to synchronize the communication of transmission blocks being broadcasted to various radio receivers of a communications system. Synchronization may create alignment between control signal blocks that are transmitted over a wide spatial area, as opposed to transmission blocks being narrowly beamformed, to ensure that pilot and channel estimation symbols across the communication system are aligned.

In some embodiments of this disclosure, framing of data may be similar to the framing of data applied in LTE, with a fixed segmentation of time, such as a slot or a frame, comprising an integer number of transmission blocks that varies depending on the length of the guard intervals.

A nominal frame format with N transmission blocks may have a certain guard interval length for a beamformed transmission having the shortest power delay profile expected. The frame size for other classes of signals may be kept the same, with a potentially decreased integer number of transmission blocks and corresponding guard interval lengths in line with the number of guard intervals between said decreased number of transmission blocks.

Embodiments of the present exemplary embodiments have the following advantages:

The determination of the guard interval length, based on the degree of beamforming used in communication of transmission blocks, reduces overhead and hence increases system efficiency.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

BF beamforming
CP cyclic prefix
dB decibel
DL downlink
GHz Giga Hertz
HPBW half power beam width
LOS line-of-sight
LTE long-term evolution
MTC machine-type communication
NLOS non-LOS
OFDM orthogonal frequency division multiplex
RMS root mean square
RX reception
SINR signal to interference and noise ratio
TB transmission block
TX transmission
UL uplink
WiMAX worldwide interoperability for microwave access

The invention claimed is:

1. A method performed in a first device wirelessly communicating with a second device, the method comprising:
obtaining a degree of beamforming to be applied in communication of a first transmission block to the second device;
determining a guard interval length based on the obtained degree of beamforming; and
applying a guard interval, having the determined guard interval length, between the first transmission block communicated to the second device and a second transmission block subsequent to the first transmission block.

2. A first device adapted to communicate wirelessly with a second device, the first device configured to:
obtain a degree of beamforming to be applied in communication of a first transmission block to the second device;
determine a guard interval length based on the obtained degree of beamforming; and
apply a guard interval, having the determined guard interval length, between the first transmission block communicated to the second device and a second transmission block subsequent to the first transmission block.

3. The first device according to claim 2, wherein the first device being configured to obtain the degree of beamforming comprises the first device being further configured to determine a first degree of beamforming to be applied by the first device when transmitting the first transmission block to the second device.

4. The first device according to claim 2, wherein the first device being configured to obtain the degree of beamforming comprises the first device being further configured to receive a second degree of beamforming from the second device, and wherein the second degree of beamforming is applied by the second device when receiving the first transmission block from the first device.

5. The first device according to claim 2, wherein the first device being configured to obtain the degree of beamforming comprises the first device being further configured to determine a beamforming gain by multiplying a first beamforming gain pertaining to a first degree of beamforming with a second beamforming gain pertaining to a second degree of beamforming.

6. The first device according to claim 2, the first device being further configured to communicate the determined guard interval length or the obtained degree of beamforming to the second device.

7. The first device according to claim 2, wherein the first device being configured to determine the guard interval length comprises the first device being further configured to apply a relation between the obtained degree of beamforming and the determined guard interval length such that higher the obtained degree of beamforming, shorter is the determined guard interval length.

8. The first device according to claim 2, wherein the first device being configured to determine the guard interval length further comprises the first device being further configured to map the obtained degree of beamforming to a guard interval length in a mapping table.

9. The first device according to claim 2, wherein the first device being configured to determine the guard interval length comprises the first device being further configured to determine a first guard interval length when the obtained degree of beamforming is below a threshold, and to determine a guard interval length being shorter than the first guard interval length when obtained the degree of beamforming equals to, or is above, the threshold.

10. The first device according to claim 2, wherein the guard interval comprises at least one of: a number of zero-symbols, a cyclic prefix, and a sequence of symbols known to the second device.

11. The first device according to claim 2, the first device being further configured to wirelessly communicate with a third device and to determine a third degree of beamforming to be applied in communication of a third transmission block to the third device, wherein the communication of the third transmission block is simultaneous to the communication of the first transmission block, and wherein the first device is further configured to determine the guard interval length based on the lower of the obtained degree of beamforming to be applied in the communication of the first transmission block and the determined third degree of beamforming to be applied in the communication of the third transmission block.

12. The first device according to claim 11, the first device being further configured to synchronize communication of said first and third transmission blocks.

13. The first device according to claim 12, the first device being configured to synchronize the communication of said first and third transmission blocks comprises the first device being further configured to communicate said first and third transmission blocks as initial transmission blocks, out of a number of transmission blocks transmitted in a time segment, to said second and third devices, respectively, wherein the number of transmission blocks transmitted within the time segment depends on what guard interval lengths are needed between the transmission blocks.

14. A method performed in a second device wirelessly communicating with a first device, the method comprising:
determining a degree of beamforming to be applied when receiving a first transmission block from the first device; and
transmitting the determined degree of beamforming to the first device, to enable the first device to determine a guard interval length to be applied for a guard interval before a transmission block that is transmitted by the first device to the second device and that is subsequent to the first transmission block.

15. A second device adapted to communicate wirelessly with a first device, the second device configured to:
determine a degree of beamforming to be applied when receiving a first transmission block from the first device; and
transmit the determined degree of beamforming to the first device, to enable the first device to determine a guard interval length to be applied for a guard interval before a transmission block that is transmitted by the first device to the second device and which is subsequent to the first transmission block.

16. The second device according to claim 15, wherein the second device being configured to determine the degree of beamforming comprises the second device being further configured to receive the degree of beamforming, to be applied in communication of the first transmission block, from the first device, the second device being further configured to:
determine the guard interval length based on the received degree of beamforming; and
receive a second transmission block from the first device, at a time, a time period after the receipt of the first transmission block, where the time period equals to the determined guard interval length.

17. The second device according to claim 15, the second device being further configured to:
receive the guard interval length, from the first device; and
receive a second transmission block from the first device, at a time, a time period after the receipt of the first transmission block, where the time period equals to the received guard interval length.

\* \* \* \* \*